United States Patent [19]

Ferrer

[11] Patent Number: 4,664,475
[45] Date of Patent: May 12, 1987

[54] COMBINER MOUNTING AND STOWAGE MECHANISM

[75] Inventor: John J. Ferrer, Los Angeles, Calif.

[73] Assignee: Hughes Aircraft Company, Los Angeles, Calif.

[21] Appl. No.: 765,895

[22] Filed: Aug. 14, 1985

[51] Int. Cl.[4] .............................................. G02B 27/14
[52] U.S. Cl. .................................................... 350/174
[58] Field of Search ................ 350/174, 601, 632, 3.7, 350/3.71, 3.72

[56] References Cited

U.S. PATENT DOCUMENTS

| 3,503,146 | 3/1970 | Woplin ................................ 350/174 |
| 3,552,828 | 1/1971 | Lawrence et al. ................... 350/174 |
| 3,816,005 | 6/1974 | Kirschner ............................ 356/251 |
| 4,309,070 | 1/1982 | St. Leger Searle .................. 350/3.7 |

FOREIGN PATENT DOCUMENTS 1213298 11/1970 United Kingdom .

OTHER PUBLICATIONS

"Flight Dynamics–Holographic HUD for Commercial Transports" Jane's Avionics, Displays/USA 1984–1985; pp. 137–138.
"FAA Nears Transport HUD Certification" by Robert R. Ropelewski, Aviation Week & Space Technology, Oct. 1, 1984, pp. 145–161.
"PSA Prepares MD-80 Aircraft for Head-up Display Flights" by Cecillia Preble, Aviation Week & Space Technology, Oct. 15, 1984, p. 43.
"Application of Head-up Displays in Commercial Transport Aircraft" by J. R. Lowe and J. R. Ornelas, J. Guidance, vol. 6, No. 2, Mar.–Apr. 1983, pp. 77–83.
"DC-9-80 A Step Forward in Cockpit Automation", Interavia 12/1978, pp. 1197–1198.

Primary Examiner—John K. Corbin
Assistant Examiner—Vincent J. Lemmo
Attorney, Agent, or Firm—Robert Thompson; A. W. Karambelas

[57] ABSTRACT

A mounting and stowage mechanism erects a head-up display combiner into the pilot's line-of-sight. One end of a crank is mounted on the combiner and is pivoted on a first link which is pivoted to a frame. A support link is pivoted on the combiner and on a drag link which is pivoted to the frame. A connecting link is pivoted to both the first link and the outer pivot of the drag link to complete a compound 4-bar linkage which controls the path of the combiner between the erected position and a stowed position out of the pilot's line-of-sight. Manual control is through a handle which is mounted on a slider for linear motion and is connected to the end of the crank remote from the combiner. The mechanism is rendered insensitive to motion in the combiner-erect position by assuring that the instant centers of the links carrying the combiner are located at twice the focal length from the combiner along a line that runs through the center of curvature of the combiner and its focal point. The mechanism thus reduces optical errors caused by play or vibration in the mechanism.

23 Claims, 4 Drawing Figures

COMBINER MOUNTING AND STOWAGE MECHANISM

BACKGROUND OF THE INVENTION

This invention relates generally to mounting and stowage mechanisms and more particularly is directed to a mechanism which mounts a head-up display combiner in a aircraft cockpit or the like for positioning in the pilot's line-of-sight and for swinging the combiner into a stowage position. The mechanism is designed so that vibration, mechanical play and other variations cause minimal effect on the optical properties of the display. The mechanism includes stops which come into play in both the active and stowed positions for loading the mechanism bearings to minimize vibration.

When the pilot is in his cockpit, he has a normal forward line-of-sight through the windscreen. This line-of-sight is generally the vector upon which the aircraft is flying. In addition to viewing the outside world in the forward direction, the pilot must also keep apprised of various other information. He has in front of him an extensive instrument panel which provides various information relating to the operational status of the aircraft and various navigational information such as heading, altitude, speed, and the like. Other information, such as weapons delivery information, may be supplied by computers and radars in military fighter aircraft.

In high-performance aircraft, it is difficult to properly observe the scene through the windscreen while simultaneously observing the panel displays which provide the data necessary for proper aircraft and weapons operation. This problem is compounded in military aircraft where there may be adversary aircraft and/or adversary anit-aircraft missiles within a dangerous range. Adversary information is often collected by radar, and, in the past, the information had been provided on cockpit panel displays. Thus, the pilot had to divide his attention between the panel display and the real world scene through the windscreen.

In order to overcome this difficulty, the head-up display was developed to provide selected information superimposed on the pilot's normal line-of-sight view of the outside world. The information was displayed with a focal length at infinity so that the pilot could observe distant outside scenes in the forward direction through his windscreen and, at the same time, view various flight, navigation and weapons delivery information without readjusting his eyes.

The head-up display includes an information source, such as a cathode ray tube, and various optical elements, such as relay lenses and fold mirrors, mounted in a housing received in an opening in the cockpit instrument panel. The optical elements direct light from the source onto a combiner which extends into the pilot's forward line-of-sight. The combiner combines the information displayed on the source with the pilot's view of the outside world. Known combiners are either partially silvered mirrors or holographic optical elements. The combiner can be thought of as a transparent display screen which presents images thereon without interfering with the pilot's view of the outside world.

It is sometimes required to provide a stowage mechanism which permits the pilot to move the combiner from a stowage position to an active position and to return the combiner from the active position to the stowage position. However, existing mechanisms are problematic in that they interfere with or degrade the optical characteristics of the display and require complex positive locking mechanisms.

SUMMARY OF INVENTION

The present invention overcomes the problems of existing devices by providing a mechanism for supporting a combiner, moving it between stowage and active positions, and mounting the combiner in the active position in such a manner that interference with or degradation of optical properties are minimized and complex positive locking mechanisms are eliminated. This is accomplished by a compound 4-bar linkage configured to render the combiner insensitive to minor link movement when in the operating position.

It is, thus, a purpose and advantage of this invention to provide a combiner mounting and stowage mechanism which supports the combiner and moves it between stowed and active positions so that the combiner is only in the pilot's line-of-sight during those periods when he desires it.

It is another purpose and advantage of this invention to provide a compound 4-bar linkage for supporting an optical element, such as a head-up display combiner, wherein the links are positioned and configured to render the combiner insensitive to minor link movement when in the operating position.

It is a another purpose and advantage of this invention to provide a 4-bar linkage mechanism which supports a combiner in such a manner that when in the active position lines through the pivots intersect approximately at twice the focal length of the combiner approximately along a line which passes through the center of curvature of the combiner and is approximately perpendicular to the radius of curvature thereof.

Other purposes and advantages of this invention will become apparent from a study of the following specification, claims and drawings.

DESCRIPTION OF THE PREFERRED EMBODIMENT

Figure 1:
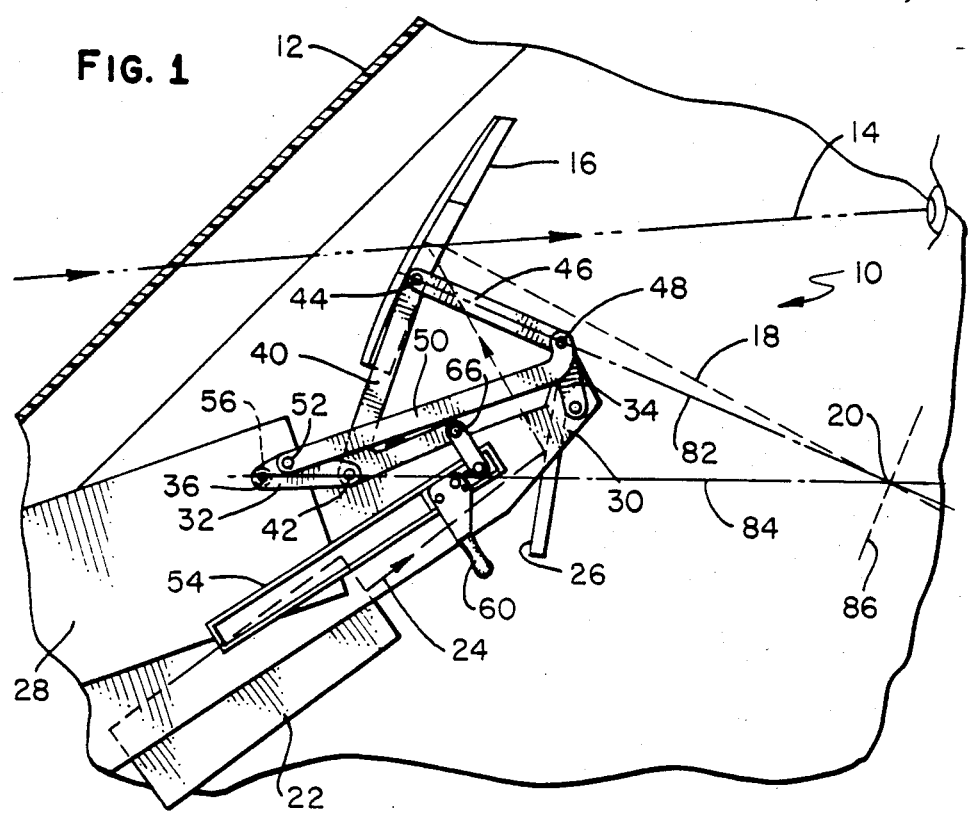
FIG. 1 is a side elevational view of a combiner mounting and stowage mechanism embodying features of the present invention, with the combiner in the erect, active position.
Figure 2:
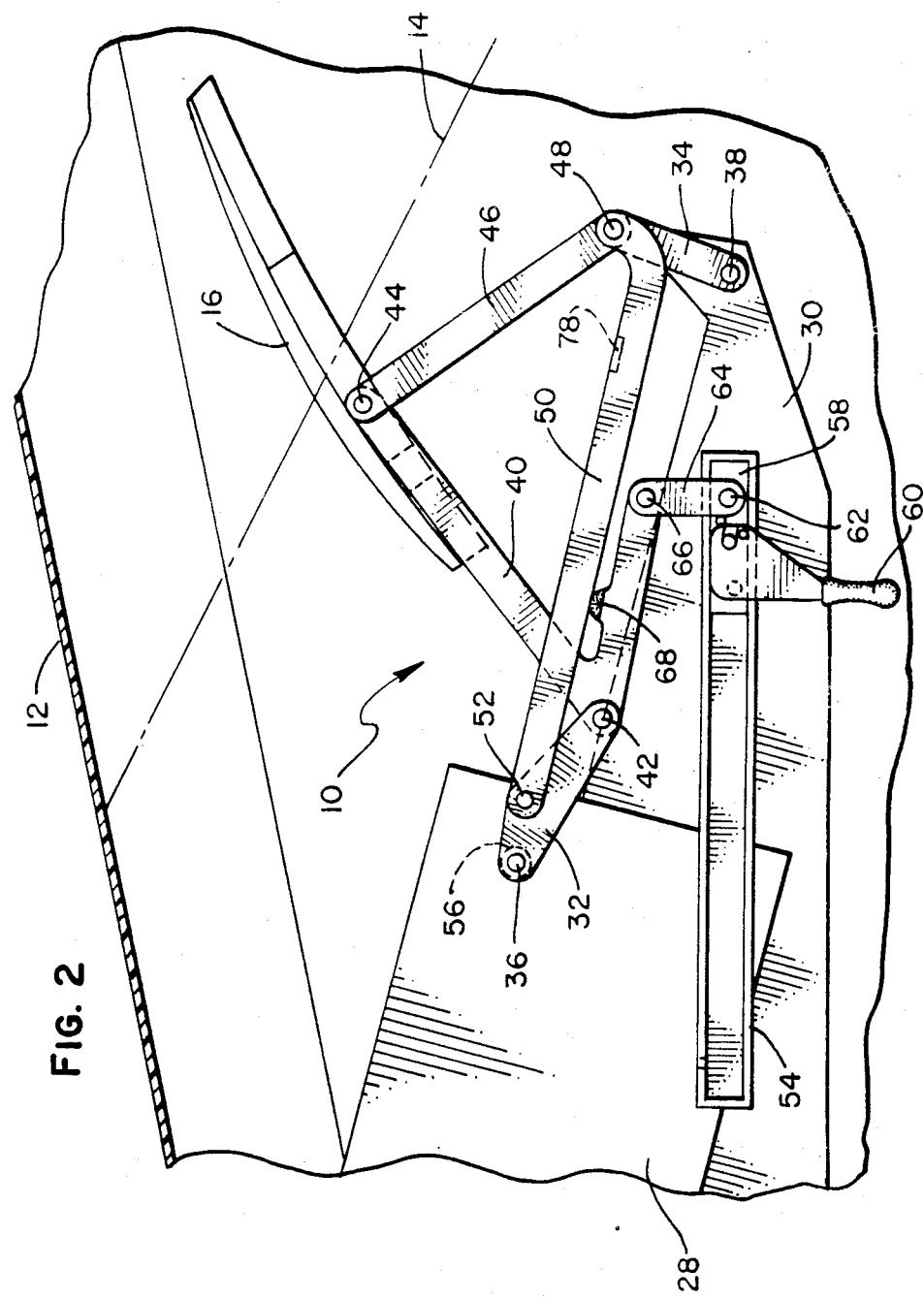
FIG. 2 is an enlarged view thereof, somewhat tilted to the right.
Figure 3:
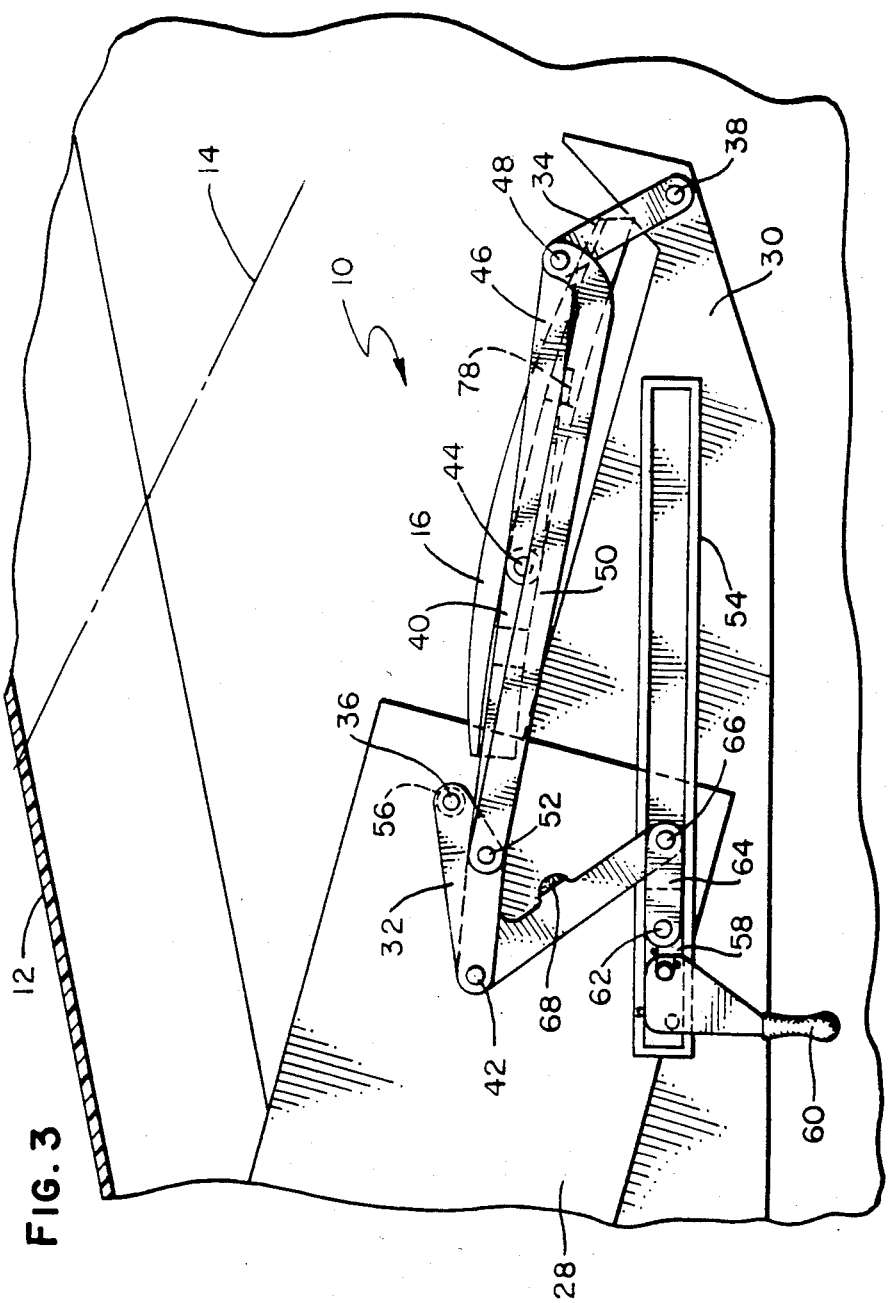
FIG. 3 is a view similar to FIG. 2 showing the combiner in the stowed position.

A combiner mounting and stowage mechanism 10 is illustrated in FIGS. 1, 2 and 3 in the front of the cockpit of an aircraft. The windscreen 12 is the traditional front windscreen of the aircraft, usually made of acrylic or the like. In FIGS. 2 and 3, the mechanism is shown with its control handle 60 movable in the horizontal direction, making the pilot's line-of-sight 14 tilted somewhat in the clockwise direction.

A head-up display combiner 16 carries a mounting plate on each side. The mechanism 10 is similarly duplicated on each side, but only one side of the mechanism will be shown and described for simplicity. The combiner 16 is a curved transparent optical element formed of acrylic, glass or the like. The radius of curvature 18 of the combiner 16 emanates from its center of curvature 20. The pilot's line-of-sight 14 passes substantially through the center of the combiner 16 when in the erect position.

The display device includes a housing 22 containing an image source and optics (not shown), which present optical information to the pilot along the path 24. That optical information is reflected by a mirror 26 to the inner surface of the combiner 16 which directs the information along the line-of-sight 14 to the pilot. The combiner and/or optics in the display device are designed to present the information at infinity, so that the pilot can see both the real world scene in front of the windscreen and superimposed information from the display device without readjusting his eyes. Although the combiner 16 is highly transmissive along the line-of-sight 14, it is often desirable to further minimize interference with the pilot's vision when he does not need the information from the display device. Consequently, the combiner 16 is mounted so that it can move out of the pilot's or copilot's line-of-sight 14 and into a stowed position.

A frame 28 is secured to or is an integral part of the cockpit instrument panel or airframe. Wings 30 are secured to the frame 28. The display device housing 22 is secured between the wings 30.

Links 32 and 34 are pivotably mounted on pivot points 36 and 38 on the frame 28 and wings 30, respectively. A link 40 has an intermediate pivot point 42 pivoted on the end of the link 32 remote from the pivot point 36. One end of the link 40 is secured to a mounting plate on a side of the combiner 16. That end of the link 40 carries a pivot pin 44 connected to the end of a link 46. The other end of the link 46 is carried on a pivot pin 48 in the end of the link 34 remote from the pivot point 38. The pivot pin 48 is also connected by a link 50 and pivot pin 52 to the link 32 between the pivots 36 and 42.

The foregoing structure creates a stable mechanism by which the combiner 16 can be moved from one position to another. A torque tube 56, shown in dashed lines in FIG. 2, interconnects the two sides of the mechanism 10 so that there is no torque transmitted through the combiner 16 and both sides of the mechanism 10 erect and stow in unison without roll or yaw in the combiner.

The structure thus described is a stable mechanism whose movement to and from locking in the end positions is accomplished by the control mechanism shown toward the bottom of FIGS. 2 and 3. The control mechanism need only be provided on one side of the mechanism 10. A linear guideway 54 is secured to the frame 28 and wings 30. The guideway 54 may have a T-slot or other similar structure therein to control the direction of a slide 58 mounted therein. The slide 58 carries a manually-engageable handle 60 thereon so that the pilot may grasp the handle 60 and move the slide 58 from end-to-end in its guideway 54. The slide 58 carries a pivot pin 62 thereon, and one end of a control link 64 is pivoted thereon. The other end of the control link 64 is carried on a pivot pin 66 in the end of the link 40 remote from the combiner 16. The links are proportioned so that when the slide 58 is in its innermost end position as (shown in FIG. 2), the combiner 16 is in its erect, active position and control link 64 is over center with its lower pin 62 slightly to the right of its upper pin 66 in the view of FIG. 2. A resilient stop 68 is mounted on the link 40 to resiliently and forcefully engage the bottom of the link 50 in the erected position. The upward force provided by the link 64 thus stresses and applies loads to all of the pivots and links in the mechanism 10 to eliminate play and reduce vibration. The slide 58 may be held in this position with a simple detent-type stop because no loading from the combiner mechanism is translated to motion in the direction of the slide 58.

Figure 4:
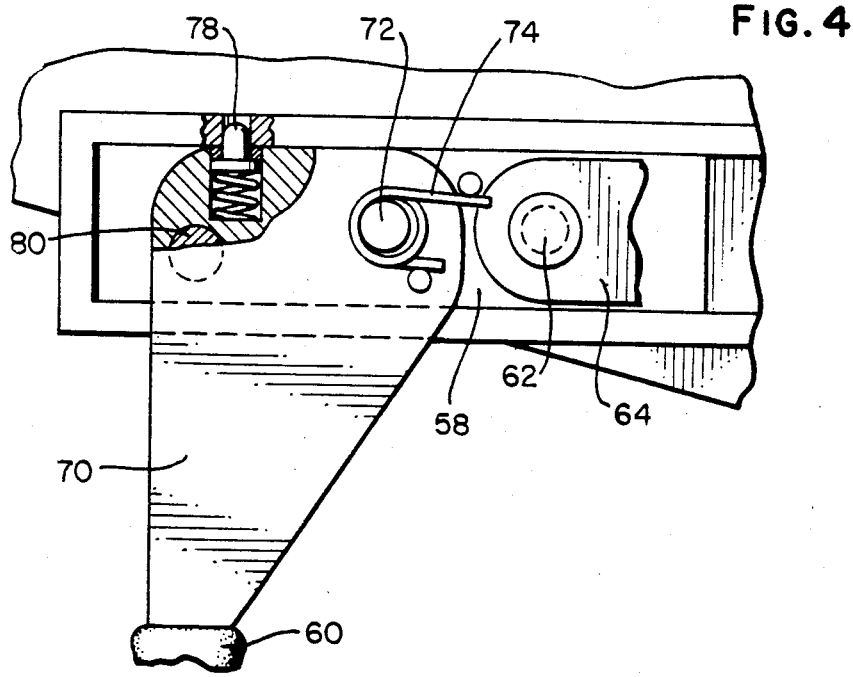
FIG. 4 is a further enlarged view of the control handle in the stowage position, with parts broken away and taken in section.

When the handle 60 is engaged by the pilot and moved away from him (as shown in FIG. 3), the various pivots and links are moved to the stowed position shown in FIG. 3. As seen in FIG. 4, the handle 60 is mounted on a plate 70 which is pivoted on a pivot pin 72. A spring 74 urges the plate 70 in the clockwise direction. As the slide 58 is moved away from the pilot, a spring-loaded plunger 76 engages a stop hole to retain the slide 58 in its outermost, combiner-stowed, end position. As seen in FIG. 3, in that position, the combiner 16 is out of the line-of-sight 14. A stop 78 is formed on the top of the link 50. In FIGS. 2 and 3, the stop 78 is seen as being turned away from the viewer and is in the path of the link 46 when the combiner 16 is in the stowed position of FIG. 3. In this position, the stop 78 engages the link 46 to stress and apply loads to all of the pivots and links to remove play and vibration from the system 10. With the slide 58 locked in the outermost end position, the combiner 16 is locked in the stowed position shown in FIG. 3 without play or vibration.

As seen in FIG. 4, when the handle 60 is pulled to the innermost end position to erect the combiner 16, the handle plate 70 pivots around its pin 72 to pull the plunger 76 from its receiving hole. With the plunger 76 pulled out, the slide 58 is free to move from the outermost end position. A stop pin 80 limits rotation of the handle plate 70, but permits a sufficient degree of rotation to pull the plunger 76 from the hole. In this way the combiner 16 is releasably locked in its stowed position.

It is preferred that the handle 60 be configured for straight line motion as shown, because it has been found that such motion is the most natural for the operator. However, it will be readily appreciated by those skilled in the art that the handle could be configured for rotational movement or some other convenient movement without departing from the present invention.

The mechanism 10 deploys the combiner 16 from a stable operating position to a stowed position completely out of the line-of-sight 14 of the pilot. The stable operating position is obtained by assuring that the instant centers of the links carrying the combiner 16 are located at twice the focal length from the combiner along a line that runs through the center of curvature 20 of the combiner 16 and its focal point. In the case of a holographic combiner, the instant centers are located on the line from the center of curvature of the combiner to the gut ray location on the combiner, i.e., the line perpendicular to the holographic fringes at the gut ray location, and their distance from the combiner is equal to twice the combiner's focal length in the vertical plane at the gut ray location.

As is seen in FIG. 1, in the erect position, the line 82 through the pivot pins 44 and 48 passes through the point 20 which is the center of curvature and twice the focal length of the combiner 16 in the vertical plane. Similarly, line 84 passes through the pivot pins 36 and 42 and intersects line 82 at the same point 20. Such is the most preferred configuration. If mounting circumstances and space criteria do not permit the intersection of lines 82 and 84 to be at the point 20, then the second preferred location of the intersection of lines 82 and 84 is on a line 86 which passes through the point 20 and is substantially at right angles to the radius of curvature 18. If the geometric instant center is off to the side of the point 20 along the line 86, less optical error is introduced than if it is in a direction along the radius 18.

The foregoing configuration reduces optical error by insuring that any play or vibration in the mechanism 10 in the combiner-erect position causes the combiner 16 to move only along a path coincident with its arc of curvature. The optical properties of the display system are such that they are far less sensitive to that motion of the combiner 16 than they are to other types of motions or misalignments of the combiner 16.

The invention has been described in its presently contemplated best mode, and it is clear that it is susceptible to numerous modifications, modes and embodiments within the ability of those skilled in the art without the exercise of the inventive faculty. Accordingly, the scope of this invention is defined by the scope of the following claims.

What is claimed is:

1. A combiner mounting and storage mechanism comprising:
   a frame for fixing with respect to the airframe of an aircraft;
   first and second links each respectively pivoted on a first pivot on said frame for pivotal movement with respect to said frame;
   mounting means for carrying a combiner;
   a support lever secured to said mounting means and pivotally mounted on a second pivot on said first link; and
   a support link pivotally connected to said mounting means and pivotally connected to said second link, said mechanism being constructed and arranged to move said combiner from a stowed position to an active position, the combiner for mounting in said mounting means having a curvature about a center of curvature which defines a central radius, said pivots of said first link and said pivots of said support link being substantially in line with a point about twice the focal length of the combiner along its radius of curvature when said combiner is in the active position.

2. The mechanism of claim 1 wherein a connecting link is pivotally connected to the pivotal connection between said second and support links and is pivotally connected to said first link intermediate said pivots thereon so as to form a fully constrained linkage mechanism.

3. The mechanism of claim 2 further including a stop positioned to engage between said support lever and said connecting link when said combiner is in the errect position to load said mechanism and inhibit vibration thereof.

4. The mechanism of claim 3 wherein a stop in said mechanism engages between said connecting link and said support link when said combiner is in the stowed position so that said mechanism is loaded in the stowed position to minimize vibration.

5. The mechanism of claim 2 wherein a stop in said mechanism engages between said connecting link and said support link when said combiner is in the stowed position so that said mechanism is loaded in the stowed position to minimize vibration.

6. A combiner mounting and storage mechanism comprising:
   a frame for fixing with respect to the airframe of an aircraft;
   first and second links each respectively pivoted on a first pivot on said frame for pivotal movement with respect to said frame;
   mounting means for carrying a combiner;
   a support lever secured to said mounting means and pivotally mounted on a second pivot on said first link; and
   a support link pivotally connected to mounting means and pivotally connected to said second link, said mechanism being constructed and arranged to move said combiner from a stowed position to an active position, the combiner having a curvature which defines a central radius, a point along the radius of curvature at about twice the focal length of the combiner and an intersection line being defined through said point at about right angles to the radius, said pivots of said first link and said pivots of said support link defining lines which intersect substantially on said intersection line when said combiner is in the active position.

7. The mechanism of claim 6 wherein a holographic optical element combiner is mounted in said mounting means.

8. The mechanism of claim 6 wherein a connecting link is pivotably connected to the pivotal connection between said second and support links and is pivotally connected to said first link intermediate said pivots thereon so as to form a fully constrained linkage mechanism.

9. The mechanism of claim 8 further including a stop positioned to engage between said support lever and said connecting link when said combiner means is in the erect position to load said mechanism and inhibit vibration thereof.

10. The mechanism of claim 9 wherein a stop in said mechanism engages between said connecting link and said support link when said combiner is in the stowed position so that said mechanism is loaded in the stowed position to minimize vibration.

11. The mechanism of claim 8 wherein a stop in said mechanism engages between said connecting link and said support link when said combiner is in the stowed position so that said mechanism is loaded in the stowed position to minimize vibration.

12. A combiner mounting and storage mechanism comprising:
   a frame for fixing with respect to the airframe of an aircraft;
   first and second links each respectively pivoted on a first pivot on said frame for pivotal movement with respect to said frame;
   mounting means for carrying a combiner;
   a support lever secured to said mounting means and pivotally mounted on a second pivot on said first link; and
   a support link pivotally connected to said mounting means and pivotally connected to said second link, said mechanism being constructed and arranged to move said combiner from a stowed position to an active position, said links and support lever being constructed and arranged to constrain the combiner to motion related to its arc of curvature when in the active position.

13. A mounting and stowage mechanism for a combiner optical element comprising:
   mounting means for the combiner optical element;

a support lever connected to said mounting means;
a frame;
a first link pivotally connected to said frame at a first pivot point, said support lever being pivotally connected to said first link at a second pivot point of said first link;
a support link having first and second pivot points by which it is respectively pivotally connected to said mounting means and to a second pivot so that said mounting means moves from a position where it is in an active position to a stowed position, a point being defined at a distance approximately equal to twice of the focal length of the combiner along its radius of curvature, a line through said pivot points of said support link being directed substantially at said point when said mounting means is in the active position and a line through said pivot points of said first link passing substantially through said point when said mounting means is in the active position so that motion of said first link and said support link close to the active position do not change movement of said point.

14. The mechanism of claim 13 wherein there is a second link pivotably connected to said frame at a first pivot point thereon, said second link being pivotally connected to said support link at a second pivot thereof.

15. The mechanism of claim 14 wherein there is a connecting link pivotably connected to said second pivot of said support link and pivotally connected to a third pivot point on said first link intermediate said first and second pivot points thereof.

16. The mechanism of claim 15 wherein there is a stop between said lever and said connecting link positioned so that said stop engages when said mounting means is in the erected position in order to load said pivots pins to reduce vibration freedom of said mechanism.

17. The mechanism of claim 16 wherein there is a stop between said support link and said connecting link which engages when said mechanism is in the stowage position so that when said stop is engaged, said pivots are loaded to reduce vibration freedom of said mechanism.

18. The mechanism of claim 15 wherein there is a stop between said support link and said connecting link which engages when said mechanism is in the stowage position so that when said stop is engaged, said pivots are loaded to reduce vibration freedom of said mechanism.

19. The mechanism of claim 15 wherein there is a manually operable handle connected to said lever so that said mechanism can be moved between its stowage position and its erect position.

20. The mechanism of claim 19 wherein there is a linear guideway mounted on said frame and a slide is movable within said linear guideway and said handle is mounted on said slide, and further including a control link pivotally connected between said slide and said support lever so that motion of said handle along its linear guideway controls the motion of said mounting means.

21. The mechanism of claim 20 wherein said control link is positioned so that it moves to retain said mechanism in the erect position.

22. The mechanism of claim 21 further including a stop between said slide and its linear guideway to releaseably retain said slide in its guideway in the stowage position to retain said support link against its stop on said connecting link to retain said mechanism in the stowage position.

23. The mechanism of claim 20 further including a stop between said slide and its linear guideway to releaseably retain said slide in its guideway in the stowage position to retain said support link against its stop on said connecting link to retain said mechanism in the stowage position.

* * * * *